United States Patent
Sylwan et al.

(10) Patent No.: US 12,367,727 B2
(45) Date of Patent: Jul. 22, 2025

(54) ENABLING ACCESS USING A TEMPORARY PASSCODE

(71) Applicant: ASSA ABLOY AB, Stockholm (SE)

(72) Inventors: Peder Sylwan, Stockholm (SE); David Bundgaard, Gustavsberg (SE)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 18/258,654

(22) PCT Filed: Dec. 16, 2021

(86) PCT No.: PCT/EP2021/086183
§ 371 (c)(1),
(2) Date: Jun. 21, 2023

(87) PCT Pub. No.: WO2022/136105
PCT Pub. Date: Jun. 30, 2022

(65) Prior Publication Data
US 2024/0265760 A1 Aug. 8, 2024

(30) Foreign Application Priority Data
Dec. 22, 2020 (SE) .................................... 2051533-4

(51) Int. Cl.
*G07C 9/33* (2020.01)
*G07C 9/00* (2020.01)

(52) U.S. Cl.
CPC .......... *G07C 9/33* (2020.01); *G07C 9/00904* (2013.01); *G07C 2209/08* (2013.01)

(58) Field of Classification Search
CPC ... G07C 9/33; G07C 9/00904; G07C 2209/08
(Continued)

(56) References Cited

U.S. PATENT DOCUMENTS 4,633,514 A * 12/1986 Fimoff ..................... H04N 5/44
455/352
5,537,681 A * 7/1996 Redden ................ H04B 7/1855
455/12.1
(Continued)

FOREIGN PATENT DOCUMENTS

WO 2006091301 8/2006
WO 2022136105 6/2022

OTHER PUBLICATIONS

"Application Serial No. PCT EP2021 086183, International Search Report, Filed Dec. 16, 2021, mailed Mar. 25, 2022.", (Dec. 16, 2021), 15 pgs.
(Continued)

*Primary Examiner* — Brian A Zimmerman
*Assistant Examiner* — Thang D Tran
(74) *Attorney, Agent, or Firm* — Schwegman Lundberg & Woessner, P.A.

(57) ABSTRACT

It is provided a method for enabling access, using a temporary passcode (25. 25a-f), to a physical space (16) secured by an electronic lock (12). The method is performed in a passcode provider (1). The method comprises: synchronising (40) with the electronic lock (12) to align times for temporary passcode generation; receiving (42) a signal to provide a temporary passcode for unlocking the electronic lock; determining (44) a temporary passcode, the temporary passcode being valid only until an end time at the electronic lock (12); and providing (46) the temporary passcode for forwarding to a temporary passcode recipient.

15 Claims, 3 Drawing Sheets

(58) Field of Classification Search
USPC .......................................................... 340/5.26
See application file for complete search history.

(56) References Cited

U.S. PATENT DOCUMENTS

| | | | |
|---|---|---|---|
| 7,669,236 B2 | 2/2010 | Fiske | |
| 7,707,622 B2 | 4/2010 | Fiske | |
| 7,979,716 B2 | 7/2011 | Fiske | |
| 12,100,250 B2* | 9/2024 | Parsadayan | G07C 9/00182 |
| 2004/0046018 A1* | 3/2004 | Dobbins | G07C 9/38 |
| | | | 235/382.5 |
| 2004/0064729 A1* | 4/2004 | Yellepeddy | H04L 63/10 |
| | | | 726/5 |
| 2010/0289615 A1* | 11/2010 | Adams | E05B 47/026 |
| | | | 340/5.2 |
| 2012/0227450 A1* | 9/2012 | Ufkes | E05C 19/186 |
| | | | 70/277 |
| 2012/0229251 A1* | 9/2012 | Ufkes | E05B 83/10 |
| | | | 340/5.26 |
| 2013/0043973 A1* | 2/2013 | Greisen | G07C 9/00817 |
| | | | 340/5.51 |
| 2015/0199857 A1* | 7/2015 | Mackin | G07C 9/00896 |
| | | | 340/5.26 |
| 2016/0191245 A1* | 6/2016 | Qin | H04L 63/0838 |
| | | | 713/168 |
| 2016/0247344 A1* | 8/2016 | Eichenblatt | A47G 29/141 |
| 2017/0084101 A1* | 3/2017 | Yun | G07C 9/00174 |
| 2017/0213406 A1* | 7/2017 | Fares | G07C 9/00309 |
| 2017/0365119 A1* | 12/2017 | Yun | G07C 9/00309 |
| 2018/0165901 A1* | 6/2018 | Lai | E05B 67/24 |
| 2018/0177319 A1* | 6/2018 | Willis | G06Q 10/1097 |
| 2018/0302397 A1* | 10/2018 | Widdows | G07C 9/00174 |
| 2018/0374293 A1* | 12/2018 | Zhang | G07C 9/00896 |
| 2019/0147674 A1* | 5/2019 | Choi | G06Q 10/02 |
| | | | 705/5 |
| 2019/0180546 A1* | 6/2019 | Tsujimura | G07C 9/00896 |
| 2019/0268169 A1* | 8/2019 | Castillo | H04L 9/0869 |
| 2019/0299930 A1* | 10/2019 | Golsch | H04W 12/04 |
| 2019/0371105 A1* | 12/2019 | Ye | H04W 12/61 |
| 2020/0342723 A1* | 10/2020 | Vos | H04N 7/186 |
| 2020/0388094 A1* | 12/2020 | Lee | H04L 63/0861 |
| 2020/0389327 A1* | 12/2020 | Klink | G07C 9/00309 |

OTHER PUBLICATIONS

"Application Serial No. PCT EP2021 086183, International Preliminary Report Patentability, Filed Dec. 16, 2021, mailed Nov. 25, 2022.", (Dec. 16, 2021), 15 pgs.

"Application Serial No. 2051533-4, Search Report, Filed Dec. 22, 2020, mailed Sep. 17, 2021.", (Dec. 22, 2020), 8 pgs.

* cited by examiner

ENABLING ACCESS USING A TEMPORARY PASSCODE

CROSS-REFERENCE TO RELATED APPLICATION(S)

This application is a national stage application under 35 U.S.C. § 371 of PCT Appl. No. PCT/EP2021/086183, titled "Enabling Access Using a Temporary Passcode," filed Dec. 16, 2021, which claims priority to Swedish Patent Appl. No. 2051533-4, filed Dec. 22, 2020, each of which is incorporated herein by reference in its entirety.

TECHNICAL FIELD

The present disclosure relates to the field of access control and in particular to enabling access, using a temporary passcode, to a physical space secured by an electronic lock.

BACKGROUND

When a person needs to enter a protected common area, such as the common areas of a multi-residential building or an office, a passcode in the form of a PIN (personal identification number) is often entered to a lock, in order to unlock the lock. The PIN can consist of a sequence of digits, e.g. four or six digits.

When deliveries are made, the passcode often needs to be shared with the delivery company, such that the delivery person can enter the building. The same applies for other services, e.g. cleaning, facilities management, etc. After entering the building, the delivery person or other service provider can go to the property of the receiver and deliver the package or provide the service.

It is a security risk to share passcodes. Consider, as an example, a multi-residential building with 50 flats. If, on average, each flat receives only a single delivery a month, about 600 people will have received the passcode each year. The passcode could of course be changed over time, but this results in inconvenience for the residents.

SUMMARY

One object is to improve the security for when pins need to be shared.

According to a first aspect, it is provided a method for enabling access, using a temporary passcode, to a physical space secured by an electronic lock. The method is performed in a passcode provider. The method comprises: synchronising with the electronic lock to align times for temporary passcode generation; receiving a signal to provide a temporary passcode for unlocking the electronic lock; determining a temporary passcode, the temporary passcode being valid only until an end time at the electronic lock, by selecting, from a plurality of currently valid temporary passcodes with different remaining validity times, the temporary passcode that has the longest remaining validity time; and providing the temporary passcode for forwarding to a temporary passcode recipient.

The determining a temporary passcode may comprise determining the temporary passcode based on a predetermined schedule of temporary passcode generation.

The signal may be a user input signal from a user interface module, based on receiving input from a user to provide the temporary passcode.

The providing the temporary passcode may comprise presenting the temporary passcode to the user.

The providing the temporary passcode may comprise transmitting the temporary passcode to the temporary passcode recipient.

The providing the temporary passcode may comprise transmitting the temporary passcode to the temporary passcode recipient via an application server.

The passcode may be in the form of a sequence of digits.

According to a second aspect, it is provided a passcode provider for enabling access, using a temporary passcode, to a physical space secured by an electronic lock. The passcode provider comprises: a processor; and a memory storing instructions that, when executed by the processor, cause the passcode provider to: synchronise with the electronic lock to align times for temporary passcode generation; receive a signal to provide a temporary passcode for unlocking the electronic lock; determine a temporary passcode, the temporary passcode being valid only until an end time at the electronic lock, by selecting, from a plurality of currently valid temporary passcodes with different remaining validity times, the temporary passcode that has the longest remaining validity time; and provide the temporary passcode for forwarding to a temporary passcode recipient.

The instructions to determine a temporary passcode may comprise instructions that, when executed by the processor, cause the passcode provider to determine the temporary passcode based on a predetermined schedule of temporary passcode generation.

The signal may be a user input signal from a user interface module, based on receiving input from a user to provide the temporary passcode.

The instructions to provide the temporary passcode may comprise instructions that, when executed by the processor, cause the passcode provider to present the temporary passcode to the user.

The instructions to provide the temporary passcode may comprise instructions that, when executed by the processor, cause the passcode provider to transmit the temporary passcode to the temporary passcode recipient.

The instructions to provide the temporary passcode may comprise instructions that, when executed by the processor, cause the passcode provider to transmit the temporary passcode to the temporary passcode recipient via an application server.

The passcode may be in the form of a sequence of digits.

According to a third aspect, it is provided a computer program for enabling access, using a temporary passcode, to a physical space secured by an electronic lock. The computer program comprises computer program code which, when executed on a passcode provider causes the passcode provider to: synchronise with the electronic lock to align times for temporary passcode generation; receive a signal to provide a temporary passcode for unlocking the electronic lock; determine a temporary passcode, the temporary passcode being valid only until an end time at the electronic lock, by selecting, from a plurality of currently valid temporary passcodes with different remaining validity times, the temporary passcode that has the longest remaining validity time; and provide the temporary passcode for forwarding to a temporary passcode recipient.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

According to embodiments presented herein, a passcode provider is first synchronised with an electronic lock. The passcode provider generates a temporary passcode (e.g. a temporary PIN), with a limited validity time. The temporary passcode is provided to a temporary passcode recipient (e.g. delivery person or other service provider) and the temporary passcode recipient can enter the passcode on a keypad of the electronic lock. The electronic lock (which has been synchronised with the passcode provider) can verify the passcode and grant access when appropriate. The same algorithm and schedule that is used for passcode generation by the passcode provider is also used for the passcode verification in the electronic lock. By synchronising the passcode provider and the electronic lock in advance, the electronic lock does not need to be constantly online. Moreover, after the temporary passcode has expired, it does not pose a security risk. Furthermore, by basing the passcode generation and verification on time, rather than a sequence of valid passcodes, the passcodes do not come out of synchronicity with each other between the passcode provider and the electronic lock. By basing the generation on time, also multiple recipients can receive concurrently valid passcodes.

Figure 1:
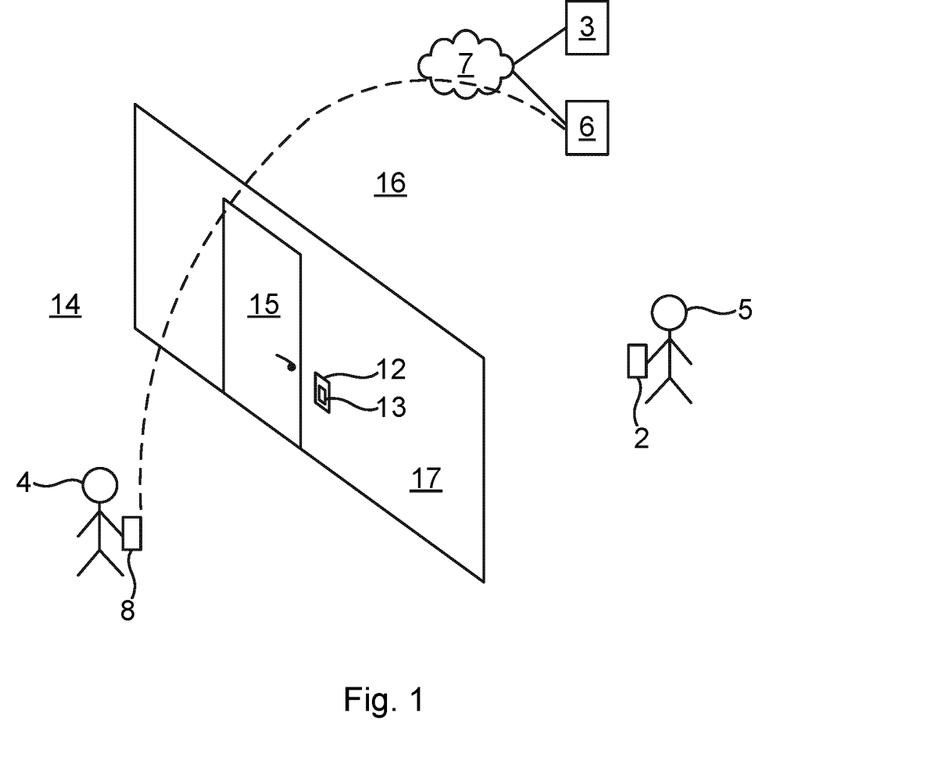
FIG. 1 is a schematic diagram illustrating an environment in which embodiments presented herein can be applied.

FIG. 1 is a schematic diagram illustrating an environment in which embodiments presented herein can be applied. Access to a physical space 16 is restricted by an openable physical barrier 15 which is selectively unlockable. The physical barrier 15 stands between the restricted physical space 16 and an accessible physical space 14. Note that the accessible physical space 14 can be a restricted physical space in itself, but in relation to this physical barrier 15, the accessible physical space 14 is accessible. The barrier 15 can be a door, gate, hatch, cabinet door, drawer, window, etc. An electronic lock 12 is provided in order to control access to the physical space 16, by selectively unlocking the barrier 15.

The electronic lock 12 can be provided in a structure 17 (such as a wall) surrounding the barrier 15 (as shown) or the electronic lock 12 can be provided in the barrier 15 itself (not shown). The electronic lock 12 is controllable to be in a locked state or in an unlocked state. The electronic lock 12 comprises a user input device 13, e.g. a keypad or touchscreen, for entry of a passcode, e.g. a pin or an alphanumeric sequence, to unlock the electronic lock 12.

Optionally, the electronic lock 12 supports one or more additional factors of authentication, e.g. by communicating with an electronic key, or biometrics.

A network 7, which can be an internet protocol (IP)-based network, is provided, to which an optional code generation server 3 and an optional application server 7 are connected. The network can e.g. comprise any one or more of a local wireless network, a cellular network, a wired local-area network, a wide-area network (such as the Internet), etc.

A user 5 has authority access the restricted physical space and can e.g. be a resident, a tenant, a facilities manager, etc. The user 5 has access to a user device 2, which can be a smartphone, computer etc., and is connected or connectable to the network 7. As explained in more detail below, the user 5 can use a method to trigger the generation of a temporary passcode, which is provided to a temporary passcode recipient 4, e.g. via a recipient device 8.

The temporary passcode recipient 4 can then enter the temporary passcode on the user input device 13 of the electronic lock 12, to thereby gain access to the restricted space.

When provided, the application server 6 can implement server functionality which interacts with an application (also known as app) on the recipient device, for communicating the temporary passcode, as describe in more detail below with reference to FIG. 3C.

Figure 2A:
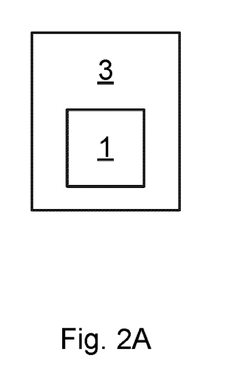
FIGS. 2A-C are schematic diagram illustrating embodiments of where the passcode provider can be implemented.
Figure 2B:
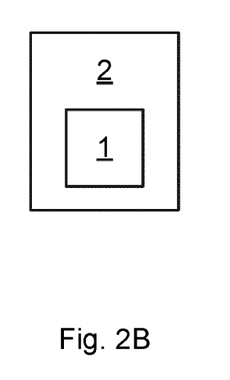
Figure 2C:
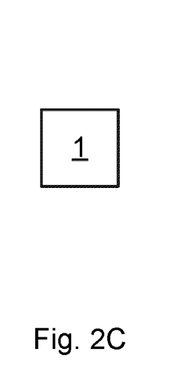

FIGS. 2A-C are schematic diagram illustrating embodiments of where the passcode provider 1 can be implemented.

In FIG. 2A, the passcode provider 1 is shown implemented in the code generation server 3, which can form part of what is commonly referred to as the cloud. The code generation server 3 is thus the host device for the passcode provider 1 in this implementation.

In FIG. 2B, the passcode provider 1 is shown implemented in the user device 2. The user device 2 is thus the host device for the passcode provider 1 in this implementation.

In FIG. 2C, the passcode provider 1 is shown as implemented as a stand-alone device. The passcode provider 1 thus does not have a host device in this implementation.

Figure 3A:
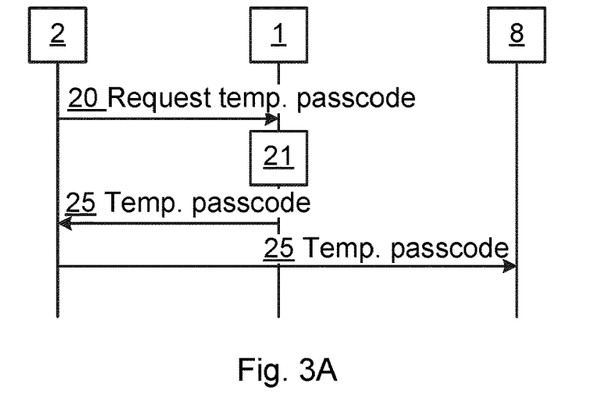
FIGS. 3A-C are sequence diagrams illustrating communication between some of the entities of FIG. 1 and FIGS. 2A-C, according to various embodiments.
Figure 3B:
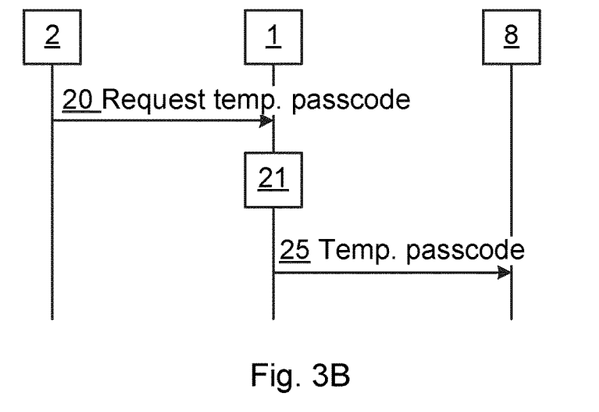
Figure 3C:
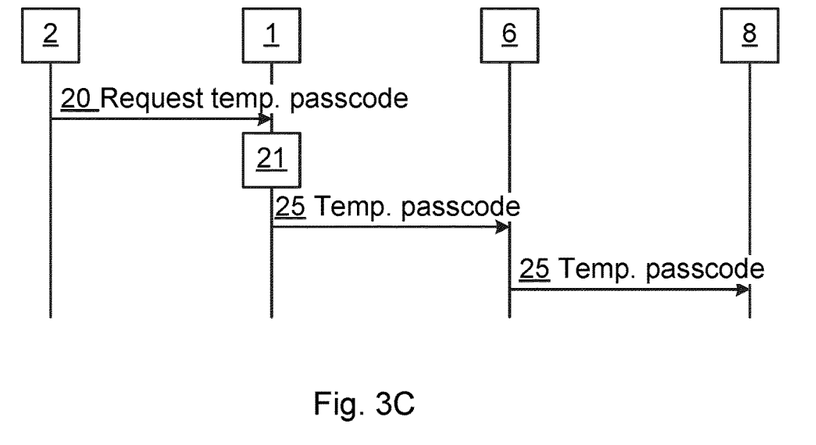

FIGS. 3A-C are sequence diagrams illustrating communication between some of the entities of FIG. 1 and FIGS. 2A-C, according to various embodiments. Specifically, the communication between the user device 2, the passcode provider 1 and the recipient device 8 are shown. In FIG. 3C, the application server 6 is also included.

First, the sequence of FIG. 3A will be described. When the user has a need to generate a temporary passcode, for a provider of a service, the user controls the user device 2 to request 20 a temporary passcode from the passcode provider 1. The request can e.g. be sent using a web interface provided by the passcode provider. Alternatively, the request is transmitted using an application on the user device 2 that interacts with corresponding server functionality on the passcode provider. Alternatively, when the passcode provider 1 is implemented in the user device 2, the request is sent using internal communication, e.g. within an application executing on the user device.

The passcode provider 1 generates 21 the temporary passcode as described in more detail below, in synchronicity with the passcode generation by the electronic lock.

Once generated, the passcode provider 1 provides the temporary passcode 25 to the user device 2. The user device 2 can now send the temporary passcode 25 to the recipient device 8, e.g. using a text message, an e-mail, or even using a voice call. The temporary passcode recipient can then enter the passcode to the electronic lock for entry to the restricted space 16. Since the passcode generation is synchronised between the temporary passcode generator 1 and the electronic lock 12, the temporary passcode can be verified without the need for online communication between the passcode generator 1 and the electronic lock 12.

In this embodiment, the temporary passcode recipient does not need any additional hardware or nor software to gain access using the temporary passcode.

Looking now to FIG. 3B, only differences from the sequence of FIG. 3A will be described. After generating the passcode 21, the passcode provider 1 here sends the temporary passcode 25 directly to the recipient device, e.g. using a text message, an e-mail or a voice call with voice synthesis informing of the temporary passcode.

Since it is the passcode provider 1 that sends the pin to the recipient device, the user can schedule the sending of passcode to a particular time or when a particular event occurs in the future. When the passcode provider 1 is not implemented in the user device 2, this allows the user device 2 to be offline, and the passcode can still be transmitted to the recipient device 8 at an appropriate time.

Looking now to FIG. 3C, only differences from the sequence of FIG. 3A will be described. After generating the passcode 21, the passcode provider 1 here sends the temporary passcode 25 to the application server 6. The application server 6 implements server-side functionality for an application on the recipient device. Hence, the application server 6 can here forward the temporary passcode 25 to the recipient device 8 for notifying the temporary passcode recipient 4.

Figure 4:
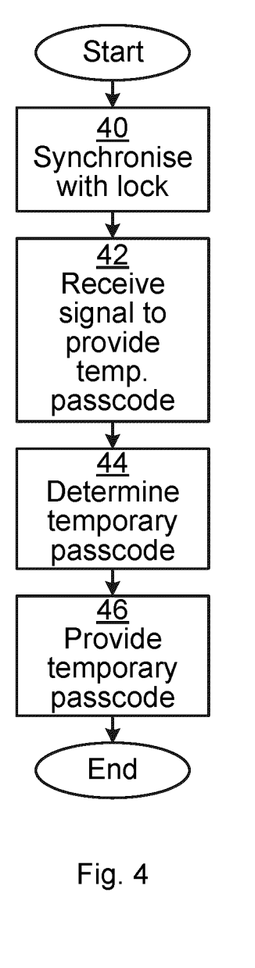
FIG. 4 is a flow chart illustrating embodiments of methods for enabling access, using a temporary passcode, to a physical space secured by an electronic lock.

FIG. 4 is a flow chart illustrating embodiments of methods for enabling access, using a temporary passcode, to a physical space secured by an electronic lock. The method is performed in the passcode provider 1. The temporary passcode can e.g. be in the form of a sequence of digits, e.g. a PIN. Alternatively, the temporary passcode is a sequence of letters and/or other characters. The passcode provider can be configured to generate temporary passcodes for a plurality of electronic locks 12, where the described methods can be performed in parallel for each one of the electronic locks 12.

In a synchronise with lock step 40, the passcode provider 1 synchronises with the electronic lock 12 to align times for temporary passcode generation. The synchronisation can e.g. occur over a wireless connection (e.g. Bluetooth, Bluetooth low energy (BLE), Wi-Fi) with the user device. The user device can act as a router or intermediary between the electronic lock 12 and the passcode provider 1 for the synchronisation.

When a visitor needs access to the physical space secured by the electronic lock, e.g. due to a service, such as a delivery, or other service, ordered by the user, the user is notified that the visitor needs access, e.g. via text message, phone call, delivery information app, etc. The user will then request a temporary passcode.

In a receive signal to provide temporary passcode step 42, the passcode provider 1 receives a signal to provide a temporary passcode for unlocking the electronic lock. The signal can be a user input signal from a user interface module, based on receiving input from the user 5 to provide the temporary passcode, e.g. from a web interface or from an application running on the user device. Optionally, the request comprises an indicated time of when the temporary passcode should be generated and transmitted. Optionally, an identifier (e.g. phone number, e-mail address, user id) of the temporary passcode recipient is provided in the request. Optionally, the request comprises an identifier of the electronic lock, for which the temporary passcode is requested.

In a determine temporary passcode 44 step, the passcode provider 1 determines a temporary passcode. The temporary passcode is valid only until an end time at the electronic lock 12. The validity duration of the temporary passcode can be configured to e.g. 1 minute, 10 minutes, etc. When the request comprises an indicated time, this step can be put in a wait time until the indicated time occurs. The temporary passcode is generated in synchronicity with passcode generation in the electronic lock. This is made possible by the earlier synchronisation and a common procedure of generating temporary passcodes over time. In other words, the temporary passcode can be determined based on a predetermined schedule of temporary passcode generation. The schedule is the same as a corresponding schedule in the electronic lock. In this way, the generated temporary passcode can be verified in the electronic lock. Each electronic lock can have its own generation of passcodes, e.g. generated according to the same algorithm but with initiated with different seeds.

Figure 5:
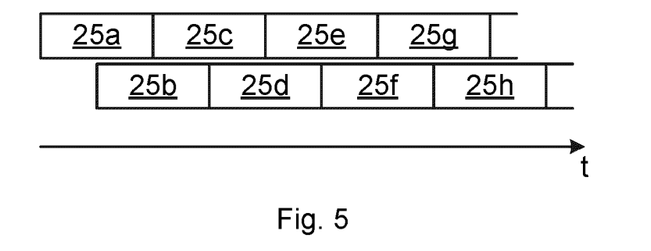
FIG. 5 is a schematic diagram illustrating a schedule of passcodes overlapping in time, which can be used in embodiments of FIG. 4.

The temporary passcode is selected to be, from a plurality of currently valid temporary passcodes with different remaining validity times, the temporary passcode that has the longest remaining validity time. The plurality of currently valid temporary passcodes thus overlap in time. This procedure is illustrated in FIG. 5 and is described in more detail below.

In a provide temporary passcode step 46, the passcode provider 1 provides the temporary passcode for forwarding to a temporary passcode recipient. This can be implemented by presenting the temporary passcode to the user 5. Alternatively, or additionally, the passcode is provided by transmitting the temporary passcode to the temporary passcode recipient.

Since the electronic lock generates a corresponding temporary passcode, the electronic lock can verify the temporary passcode when this is entered by the temporary passcode recipient. The electronic lock executes a passcode verification algorithm which corresponds to the passcode generation, to be able to verify the temporary passcode.

Optionally, the lock also accepts a static passcode, which can be used by legitimate users and can be shared with people for which the legitimate users have a high level of trust, e.g. family members.

Using embodiments presented herein, the user can make sure the recipient receives a valid temporary passcode to gain access to the restricted physical space. After expiry, the temporary passcode is unusable and poses no security risk. At the same time, the temporary passcode is easy for the user to share with the recipient. Hence a solution is provided which is both secure and convenient.

FIG. 5 is a schematic diagram illustrating a schedule of passcodes overlapping in time, which can be used in embodiments of FIG. 4. The same (predetermined) schedule is used both by the passcode provider 1 and the electronic lock 12. Time flows from left to right. The (horizontal) extension in FIG. 5 of each temporary passcode 25a-f indicates its period of validity. There is a significant overlap in validity between passcodes. When half of the validity time of a temporary passcode is left before it expires, a new temporary passcode becomes valid in parallel. There is thus an overlap of half a validity time between temporary passcodes and there are two passcodes that are valid at each point in time.

When determining a temporary passcode, and applying the principles of FIG. 5, of the two valid passcodes, the passcode provider selects, from a plurality of currently overlapping valid temporary passcodes with different remaining validity times, the temporary passcode that has the longest remaining validity time. This reduces the risk of the passcode expiring prior the temporary passcode recipient being able to enter it.

At any point in time, the electronic lock accepts either one of the concurrently valid passcodes to grant access.

Figure 6:
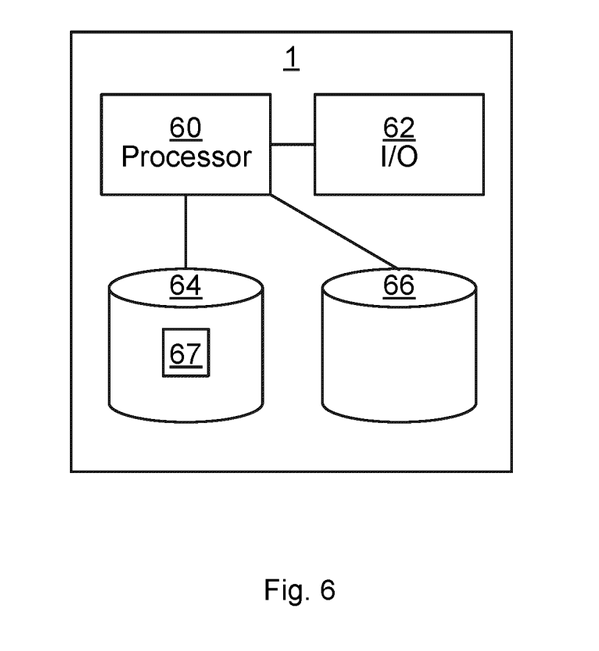
FIG. 6 is a schematic diagram illustrating components of the passcode provider of FIGS. 2A-C.

FIG. 6 is a schematic diagram illustrating components of the passcode provider 1 of FIG. 2A-C. It is to be noted that when the authentication device 1 is implemented in a host device, one or more of the mentioned components can be shared with the host device. A processor 60 is provided using any combination of one or more of a suitable central processing unit (CPU), graphics processing unit (GPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 4 above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The passcode provider 1 further comprises an I/O interface 62 for communicating with external and/or internal entities. Optionally, the I/O interface 62 also includes a user interface.

Other components of the passcode provider 1 are omitted in order not to obscure the concepts presented herein.

Figure 7:
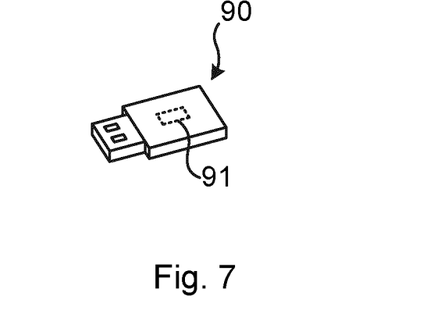
FIG. 7 shows one example of a computer program product comprising computer readable means

FIG. 7 shows one example of a computer program product 90 comprising computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 6. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

It will now be presented a list of embodiments, enumerated with roman numerals.

i. A method for enabling access, using a temporary passcode, to a physical space secured by an electronic lock, the method being performed in a passcode provider, the method comprising:
  synchronising with the electronic lock to align times for temporary passcode generation;
  receiving a signal to provide a temporary passcode for unlocking the electronic lock;
  determining a temporary passcode, the temporary passcode being valid only until an end time at the electronic lock; and
  providing the temporary passcode for forwarding to a temporary passcode recipient.

ii. The method according to embodiment i, wherein the determining a temporary passcode comprises determining the temporary passcode based on a predetermined schedule of temporary passcode generation.

iii. The method according to embodiment i or ii, wherein the signal is a user input signal from a user interface module, based on receiving input from a user to provide the temporary passcode.

iv. The method according to embodiment iii, wherein the providing the temporary passcode comprises presenting the temporary passcode to the user.

v. The method according to any one of the preceding embodiments, wherein the providing the temporary passcode comprises transmitting the temporary passcode to the temporary passcode recipient.

vi. The method according to any one of the preceding embodiments, wherein the providing the temporary passcode comprises transmitting the temporary passcode to the temporary passcode recipient via an application server.

vii. The method according to any one of the preceding embodiments, wherein the determining a temporary passcode comprises selecting, from a plurality of currently valid temporary passcodes with different remaining validity times, the temporary passcode that has the longest remaining validity time.

viii. The method according to any one of the previous embodiments, wherein the passcode is in the form of a sequence of digits.

ix. A passcode provider for enabling access, using a temporary passcode, to a physical space secured by an electronic lock, the passcode provider comprising:
  a processor; and
  a memory storing instructions that, when executed by the processor, cause the passcode provider to:
  synchronise with the electronic lock to align times for temporary passcode generation;
  receive a signal to provide a temporary passcode for unlocking the electronic lock;
  determine a temporary passcode, the temporary passcode being valid only until an end time at the electronic lock; and
  provide the temporary passcode for forwarding to a temporary passcode recipient.

x. The passcode provider according to embodiment ix, wherein the instructions to determine a temporary passcode comprise instructions that, when executed by the processor, cause the passcode provider to determine the temporary passcode based on a predetermined schedule of temporary passcode generation.

xi. The passcode provider according to embodiment ix or x, wherein the signal is a user input signal from a user interface module, based on receiving input from a user to provide the temporary passcode.

xii. The passcode provider according to embodiment xi, wherein the instructions to provide the temporary passcode comprise instructions that, when executed by the processor, cause the passcode provider to present the temporary passcode to the user.

xiii. The passcode provider according to any one of embodiments ix to xii, wherein the instructions to provide the temporary passcode comprise instructions that, when executed by the processor, cause the passcode provider to transmit the temporary passcode to the temporary passcode recipient.

xiv. The passcode provider according to any one of embodiments ix to xiii, wherein the instructions to provide the temporary passcode comprise instructions that, when executed by the processor, cause the passcode provider to transmit the temporary passcode to the temporary passcode recipient via an application server.

xv. The passcode provider according to any one of embodiments ix to xiv, wherein the instructions to determine a temporary passcode comprise instructions that, when executed by the processor, cause the passcode provider to select, from a plurality of currently valid temporary passcodes with different remaining validity times, the temporary passcode that has the longest remaining validity time.

xvi. The passcode provider according to any one of embodiments ix to xv, wherein the passcode is in the form of a sequence of digits.

xvii. A computer program for enabling access, using a temporary passcode, to a physical space secured by an electronic lock, the computer program comprising computer program code which, when executed on a passcode provider causes the passcode provider to:

synchronise with the electronic lock to align times for temporary passcode generation;

receive a signal to provide a temporary passcode for unlocking the electronic lock;

determine a temporary passcode, the temporary passcode being valid only until an end time at the electronic lock; and provide the temporary passcode for forwarding to a temporary passcode recipient.

xviii. A computer program product comprising a computer program according to embodiment xvii and a computer readable means on which the computer program is stored.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for enabling access, using a temporary passcode, to a physical space secured by an electronic lock, the method being performed in a passcode provider, the method comprising:

synchronising with the electronic lock to align times for temporary passcode generation;

receiving a signal to provide a temporary passcode for unlocking the electronic lock;

determining a temporary passcode, the temporary passcode being valid only until an end time at the electronic lock, by selecting, from a plurality of currently valid temporary passcodes with different remaining validity times, the temporary passcode that has the longest remaining validity time; and providing the temporary passcode for forwarding to a temporary passcode recipient.

2. The method according to claim 1, wherein the determining the temporary passcode comprises determining the temporary passcode based on a predetermined schedule of temporary passcode generation.

3. The method according to claim 1, wherein the signal is a user input signal from a user interface module, based on receiving input from a user to provide the temporary passcode.

4. The method according to claim 3, wherein the providing the temporary passcode comprises presenting the temporary passcode to the user.

5. The method according to claim 1, wherein the providing the temporary passcode comprises transmitting the temporary passcode to the temporary passcode recipient.

6. The method according to claim 1, wherein the providing the temporary passcode comprises transmitting the temporary passcode to the temporary passcode recipient via an application server.

7. The method according to claim 1, wherein the passcode is in the form of a sequence of digits.

8. A passcode provider for enabling access, using a temporary passcode, to a physical space secured by an electronic lock, the passcode provider comprising:

a processor; and a memory storing instructions that, when executed by the processor, cause the passcode provider to:

synchronise with the electronic lock to align times for temporary passcode generation;

receive a signal to provide a temporary passcode for unlocking the electronic lock;

determine a temporary passcode, the temporary passcode being valid only until an end time at the electronic lock, by selecting, from a plurality of currently valid temporary passcodes with different remaining validity times, the temporary passcode that has the longest remaining validity time; and provide the temporary passcode for forwarding to a temporary passcode recipient.

9. The passcode provider according to claim 8, wherein the instructions to determine the temporary passcode comprise instructions that, when executed by the processor, cause the passcode provider to determine the temporary passcode based on a predetermined schedule of temporary passcode generation.

10. The passcode provider according to claim 8, wherein the signal is a user input signal from a user interface module, based on receiving input from a user to provide the temporary passcode.

11. The passcode provider according to claim 10, wherein the instructions to provide the temporary passcode comprise instructions that, when executed by the processor, cause the passcode provider to present the temporary passcode to the user.

12. The passcode provider according to claim 8, wherein the instructions to provide the temporary passcode comprise instructions that, when executed by the processor, cause the passcode provider to transmit the temporary passcode to the temporary passcode recipient.

13. The passcode provider according to claim 8, wherein the instructions to provide the temporary passcode comprise instructions that, when executed by the processor, cause the passcode provider to transmit the temporary passcode to the temporary passcode recipient via an application server.

14. The passcode provider according to claim 8, wherein the passcode is in the form of a sequence of digits.

15. A non-transitory computer readable storage medium storing a computer program for enabling access, using a temporary passcode, to a physical space secured by an electronic lock, the computer program comprising computer program code which, when executed on a passcode provider causes the passcode provider to:

synchronise with the electronic lock to align times for temporary passcode generation;

receive a signal to provide a temporary passcode for unlocking the electronic lock;

determine a temporary passcode, the temporary passcode being valid only until an end time at the electronic lock, by selecting, from a plurality of currently valid temporary passcodes with different remaining validity times, the temporary passcode that has the longest remaining validity time; and provide the temporary passcode for forwarding to a temporary passcode recipient.

\* \* \* \* \*